April 28, 1953  P. ARBEIT  2,636,914
FURNACE FOR MAKING GLASS
Filed Sept. 12, 1946
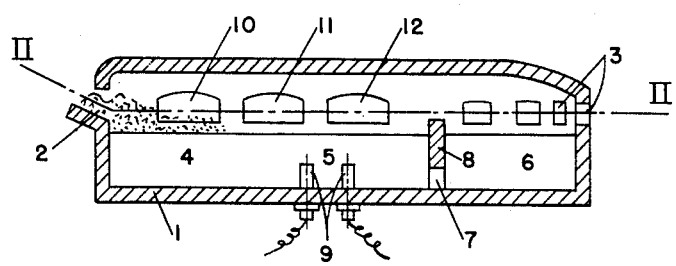
Fig. I
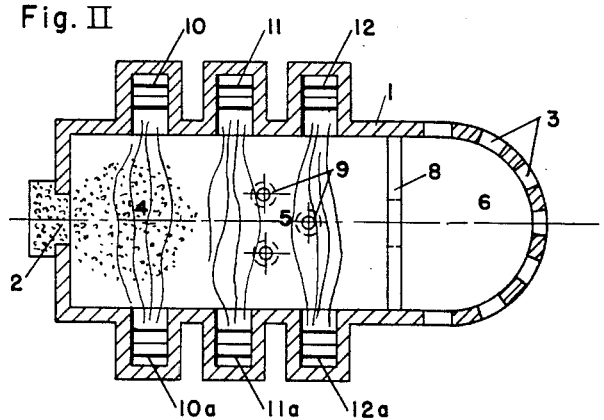
Fig. II
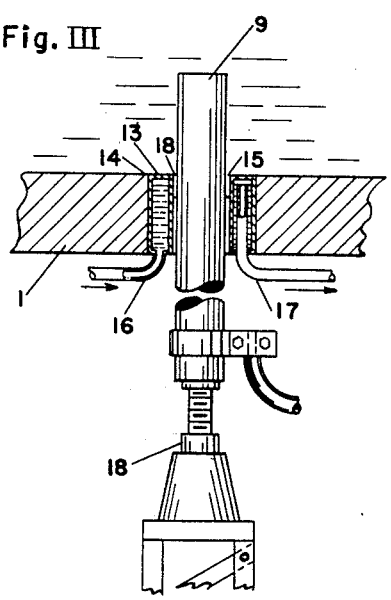
Fig. III
INVENTOR.
Pierre Arbeit
BY
Dale A. Bauer
ATTORNEY.

Patented Apr. 28, 1953

2,636,914

UNITED STATES PATENT OFFICE 2,636,914

FURNACE FOR MAKING GLASS

Pierre Arbeit, Paris, France, assignor to Societe Anonyme des Manufactures des Glaces et Produits Chimiques de Saint-Gobain, Chauny & Cirey, Paris, France Application September 12, 1946, Serial No. 696,451
In France September 15, 1945

5 Claims. (Cl. 13—6)

This invention relates to the manufacture of glass.

In the manufacture of glass there are three recognized steps, melting the raw materials, fining the glass, and working it. These steps are carried out under different conditions of temperature. In some glass making processes the manufacture is carried out in furnaces that contain tons of glass. The glass in such furnaces, particularly in the case of continuous processes, is in constant motion, horizontally induced by the movement of the glass from the melting to the working end of the furnace, and vertically induced by the effect of the different temperatures upon the bath. These factors produce currents in the glass that have heretofore been relatively uncontrollable, have produced imperfect glass, and have led to the construction of furnace types designed to ameliorate the conditions.

Another problem that has been difficult to solve has concerned the fining of the melted glass. That is a step in which the melted glass, containing gas bubbles and undissolved raw materials, of which some are in minutely subdivided condition, are brought to a temperature materially higher than that employed in the melting so that the bubbles disengage themselves and the bath becomes homogeneous.

The fining process, because of its temperature, introduces further problems. The tank is lined with a refractory material, the ingredients of which are undesirable in the glass and in most instances definitely degrade it, but the fining temperatures, in previous heating systems, were attained only by heat so intense at the surface of the bath that occasional degradation of large batches occurred by incorporation of ingredients of the tank walls.

Originally these temperatures were attained by flames alone. Later it was proposed to employ electric heating by Joule effect, electrodes being lowered into the upper surface of the fining zone to create there a fining temperature. Then it was proposed to combine the external and internal heating of the bath. There is thus obtained a particularly high temperature localized at the surface of the bath.

However, that procedure is not always easy nor exempt from limitations. One encounters, for example, attacks upon the refractories of the tank, attacks upon the electrodes, and coloration of the glass. It has furthermore been found that some of the minute undissolved raw materials from the melting zone have made their way into the working zone without having been fined. In continuous furnaces, where large bulks of glass are handled daily and the furnaces are kept running continuously, it has been most difficult to determine the reasons for the imperfections of the prior art. The temperatures at which the operations are carried out, the mass of material and the cost involved, and the enclosed condition of the apparatus alike combine to make the determination of the cause of faults and experimentation for their correction both practically and financially difficult. Nevertheless, in spite of these handicaps, I have succeeded in improving the said processes without materially altering the basic and fundamental characteristics of furnaces of generally successful and advanced design.

It is an object of this invention to improve the manufacture of glass, particularly in continuous furnaces, so that the glass will be fully fined before being admitted to the working chamber; so that the fining temperature will be attained with no, or a positive minimum of, attack upon the refractory materials of the tank; so that minute undissolved particles from the melting zone will not inadventently make their way into the working zone; and so that carbon, or other, electrodes may be employed to produce heating of the bath by Joule effect without imparting carbonaceous coloration or content to the glass. Inasmuch as the fining temperature must be very high, approaching the point at which the refractory materials and the carbon begin to dissolve in the glass, it will be understood that the attaining of these objects is of material difficulty.

The present invention corrects these difficulties. It comprises heating the fining portion of the bath by joining the effect of a source of heat situated above the bath with an electric current introduced in the bath by means of electrodes that penetrate the bottom of the receptacle at places spaced from the lateral walls, and that are in contact with the depth of the bath and are localized in that part.

It has been established that under these conditions it is possible to obtain highly refined glass that has no coloration from the electrodes and with an expenditure of heat energy per kilo of glass produced less than that required in the ordinary process of fining by means of flame alone. It has been additionally established that these advantages are retained when glass of types hard to fuse are made, such for example as the special glass of low coefficient of expansion.

It is difficult to explain why electrodes placed in the lower part of the bath should be more exempt from corrosion than identical electrodes placed in its upper level, but such is the fact. It is another astonishing fact that the electrodes, although submerged in the depths of the bath are more efficacious in producing a high temperature at its surface than can be explained by the convection currents of glass rising from the electrodes vertically through the bath and expanding at the surface in direct beneficial exposure to the action of the source of heat above the bath. The extraordinary efficiency of heating may be due to my discovery, part of this invention, that the electric current has a tendency to pass between the electrodes by curved paths that extend from the depth of the bath into its upper levels, or to some other cause, but it is the fact, regardless of cause. To summarize, the two heat sources, that placed above the bath and that introduced by the passage of the electric current in the glass, unite their heating effects in the upper layer of the bath and produce there a very high temperature, but without the harmful necessity of exposing the electrodes to that temperature.

The base of the electrode itself is in a zone particularly remote from the dangers of overheating, which tends to protect the refractory wall of the tank in the region where the electrode penetrates it. As the electrodes pass through the bottom of the tank at places spaced from the lateral walls, and at points situated substantially in the central zone of the furnace, and before the orifice 7, the glass that is heated by the electrodes does not contact the walls except after being extended on the surface of the bath, that is to say, after having lost its speed and consequently its power to erode these walls, which helps to explain both the long life of the walls and the excellent quality of the glass.

One may employ any appropriate means of heating the outside of the bath, in the fining zone, for instance heating by flames or by electrical resistances.

The invention is applicable to continuous processes of making glass as well as to batch processes.

In manufacturing by a continuous process, where, as will be understood, the materials travel from one extremity of the tank to the other and pass successively through the zones of fusion, of fining, and of cooling the mixture to a temperature convenient for working the glass, one can employ any process of fusion with the process of fining that constitutes the major object of this invention. It is thus that in the fusion zone the glass may be heated solely by flames circulated above the bath or solely by an electric current passed through the glass, by a combination of both these methods, or by other means.

A particularly simple and advantageous method for carrying out the process consists in applying the invention to a furnace for continuous manufacture in which the fusion and fining are carried out in a single chamber or vat, the fining zone following after the fusion zone without a refractory partition between them, the fining zone being separated by a partition and communicating with the working zone by an orifice at the bottom of the tank. In such a furnace, which has the advantage of lacking refractory materials between the fusion and fining zones where they are most strongly attacked, the prior art had the disadvantage that materials not yet fined passed through directly from the fusion zone to the working zone, somehow escaping the high temperatures and fining conditions that existed at the surface of the fining zone. In applying the present invention to the fining step of such a furnace, one overcomes the latter inconvenience because the heating of the depths of the bath compels the glass to leave the depths of the tank and seek the surface where it is exposed to the flames.

The attached drawing represents, for an illustrative example only, a furnace adapted to accomplish the objects of the invention. In this drawing, Fig. 1 is a vertical sectional view on the longitudinal axis of the glass making furnace;

Fig. 2 is a horizontal section on line II—II of Fig. 1; and

Fig. 3 is a vertical section of the mounting of the electrodes.

The vat 1 has at one end a charging opening 2 by which the raw materials are introduced to the furnace, and at the other end, orifices 3 by which the finished glass is withdrawn. The tank presents successively the zones of fusion 4, of fining 5, and of working 6. The fining zone 5 directly adjoins the fusion zone without an intervening wall between the zones. The fining zone 5 contains the vertical electrodes 9, that are admitted through the bottom of the tank. These electrodes are remote from the vertical walls of the tank and have a height regulated to the lower levels of the glass mass. They are placed before the orifice 7. With the source of heat provided by the electrodes there is combined a source exterior to the bath, being constituted in the example by pairs of laterally arranged burners 10—10a, 11—11a, and 12—12a, of which the flames cross the furnace above the surface of the glass.

The insertion of the electrodes through the bottom of the tank without the escape of glass is accomplished by means of a mechanism shown in Fig. 3, wherein a metallic box 13, built after the manner of a water-jacket, is disposed in an orifice 14, through the bottom 1 of the vat. The inner side 15 of this water-jacket has the same shape as the electrode 9, but with a little larger dimension; for example, in the case of a cylindrical electrode, its diameter is a little greater than this of the electrode, so that a play of a few millimeters remains between the electrode 9 and the inner side 15 of the box 13. The circulation of the water in the water-jacket is made in introducing the water through the admittance pipe 16, in the bottom of the water-jacket, and evacuating it through the escapement pipe 17, which begins in the over part of the water-jacket, in such a way that the water circulates effectively in all parts of this. The electrode 9, generally of graphite, is sustained by means of a screw-jack 18, by means of which it is possible to lift up the electrode, in order to regulate the height of the part of the electrode which is in contact with the melted glass, and to keep up this height in accordance with the wear of the electrode during its function. With such a disposition, I have established that the glass which penetrates between the water-jacket and the electrode becomes cool and stiff after a very short course (some centimeters), and forms by itself an obstacle against the flowing out of the liquid glass. Nevertheless, this seal of hard glass has a very short height, and does not impede the vertical motion of the electrode.

In order to show the advantages obtained with this process, I can mention the results attained in the manufacture of goods of white glass of prime quality, in a furnace with a vat of 6 meters length, 4 meters of width, and 1 meter depth, of a type analogous to the furnace shown in the Figures 1 and 2. With the former process and when the furnace was heated only with flames, it was possible to obtain about 24 tons of glass a day. By using the process according to the invention, with the same furnace (Figs. 1 and 2), it has been possible to obtain 34 tons a day of glass of the same prime quality.

This result was obtained on account of the increase of the rapidity of the fining, procured by the use of the present invention, and without any alteration of the perfect whiteness of the glass, in consequence of the use of the graphite electrodes.

When this invention is applied to a batch process, in which melting, fining and working occur in a single chamber at different times, the raw materials may be melted if desired solely by means of externally applied heat, the use of the electrodes being reserved for the fining operation. However, electrodes and external heat may be applied simultaneously during the melting and even during the working operation provided appropriate control of the temperature is maintained.

An advantage of this invention is that the efficiency of furnaces is considerably increased, the production of degraded glass is reduced, the disintegration of the refractory walls of the tank is checked, and the life of the electrodes is prolonged. Glass of superior quality is produced with a less variation from standard. Coloring of the glass is avoided; the cost of production is not increased, and the technical results are superior.

As many apparently widely different embodiments of this invention may be made without departing from the spirit and scope thereof, it is to be understood that the invention is not limited to the specific embodiments, except as defined in the appended claims.

What is claimed is:

1. A glass furnace having a fining chamber separated from a working chamber by a barrier with a small central orifice in the lower level of the chamber, means to heat the glass in the fining chamber externally, and electrodes extending only into the lower level of the glass before the orifice and remote from the walls of the fining zone through the bottom of the furnace.

2. A glass furnace in which the glass is subjected to the melting, fining and conditioning operations in successive zones of the furnace, means to heat the glass in the fining zone externally above its surface, and electrode heating means penetrating the bottom of the furnace in the fining zone, said electrode means restricted to a position remote from the walls of the furnace and extending into the lower part of the glass bath only.

3. A glass furnace having a common chamber in which the melting and fining operations are performed in successive zones and a working zone separated therefrom by a partition provided with an orifice in the lower part of the furnace, heaters located above the glass pool in the said chamber adapted to heat the surface of the glass bath, and electrode heating means penetrating the bottom of the furnace in the fining zone in a position wholly remote from the walls of the furnace and extending into the lower level of the glass only.

4. A glass furnace having a combined melting fining compartment, and a working compartment that is separated from the fining compartment by a wall with a small submerged orifice at the bottom, flame heating means operating throughout the melting and fining compartment, and submerged Joule effect rod electrodes extending upward into the fining zone through the bottom of the tank in front of said orifice, all of said electrodes being remote from the tank walls, some of said electrodes being adapted to be aligned across the flow of glass as it passes toward the orifice, and at least one of said electrodes being adjustable vertically.

5. The furnace of claim 4 in which there are three electrodes, which are connected to a three phase electrical system two of which electrodes spread a Joulè effect barrier across the flow of glass toward said orifice, and the third of which is itself directly before said orifice.

PIERRE ARBEIT.

References Cited in the file of this patent

UNITED STATES PATENTS

| Number | Name | Date |
| --- | --- | --- |
| 766,771 | Richardson | Aug. 2, 1904 |
| 950,905 | Fitzgerald | Mar. 1, 1910 |
| 1,186,076 | Chambers | June 6, 1916 |
| 1,542,716 | Payne | June 16, 1925 |
| 1,594,496 | Clark | Aug. 3, 1926 |
| 1,820,248 | Raeder | Aug. 25, 1931 |
| 1,827,471 | Hitner | Oct. 13, 1931 |
| 1,944,855 | Wadman | Jan. 23, 1934 |
| 2,089,690 | Cornelius | Aug. 10, 1937 |
| 2,122,469 | Hitner | July 5, 1938 |
| 2,159,361 | Atkinson et al. | May 23, 1939 |
| 2,209,515 | Ehman et al. | July 30, 1940 |
| 2,225,616 | Borel | Dec. 24, 1940 |
| 2,267,537 | Romazzotti | Dec. 23, 1941 |
| 2,283,188 | Cornelius | May 19, 1942 |
| 2,369,233 | Hopkins | Feb. 13, 1945 |
| 2,375,049 | Tama et al. | May 1, 1945 |

FOREIGN PATENTS

| Number | Country | Date |
| --- | --- | --- |
| 853,292 | France | Nov. 28, 1939 |
| 854,991 | France | Jan. 29, 1940 |
| 865,278 | France | Feb. 17, 1941 |